US012495269B2

(12) United States Patent
Mate et al.

(10) Patent No.: US 12,495,269 B2
(45) Date of Patent: Dec. 9, 2025

(54) METHOD AND APPARATUS FOR LOW COMPLEXITY LOW BITRATE 6DOF HOA RENDERING

(71) Applicant: Nokia Technologies Oy, Espoo (FI)

(72) Inventors: Sujeet Shyamsundar Mate, Tampere (FI); Jussi Artturi Leppanen, Tampere (FI); Arto Juhani Lehtiniemi, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 150 days.

(21) Appl. No.: 17/965,971

(22) Filed: Oct. 14, 2022

(65) Prior Publication Data

US 2023/0123253 A1 Apr. 20, 2023

(30) Foreign Application Priority Data

Oct. 18, 2021 (GB) .................................... 2114833

(51) Int. Cl.
*H04S 7/00* (2006.01)
*H04S 3/00* (2006.01)

(52) U.S. Cl.
CPC .............. *H04S 7/304* (2013.01); *H04S 3/008* (2013.01); *H04S 2400/01* (2013.01); *H04S 2400/11* (2013.01); *H04S 2400/15* (2013.01); *H04S 2420/11* (2013.01)

(58) Field of Classification Search
None
See application file for complete search history.

(56) References Cited

U.S. PATENT DOCUMENTS

2003/0035553 A1* 2/2003 Baumgarte ............... H04S 3/00 381/2
2014/0350944 A1* 11/2014 Jot .......................... G10L 19/20 704/500
2018/0007490 A1* 1/2018 Lehtiniemi ............. H04S 3/008
2020/0021940 A1 1/2020 Choueiri et al. .................. 7/304
2021/0185470 A1 6/2021 Salehin et al. .................... 7/304
2021/0191687 A1* 6/2021 Latina ..................... G06F 3/165

FOREIGN PATENT DOCUMENTS

EP 3301951 A 4/2018
GB 2574238 A 12/2019
JP 2020527746 A 9/2020
WO WO 2014/099285 A1 6/2014
WO WO 2018/132677 A1 7/2018
WO WO-2021170900 A1 * 9/2021 ............ H04R 3/005

* cited by examiner

*Primary Examiner* — Qin Zhu
(74) *Attorney, Agent, or Firm* — McCarter & English, LLP

(57) ABSTRACT

An apparatus for generating an immersive audio scene, the apparatus including circuitry configured to: obtain audio scene based sources, the audio scene based sources are associated with one or more positions in an audio scene, wherein each audio scene based source includes at least one spatial parameter and at least one audio signal; determine at least one position associated with at least one of the audio scene based sources; generate at least one audio source based on the determined at least one position, wherein the circuitry is configured to: generate at least one spatial audio parameter; and generate at least one audio source signal; and generate information about a relationship between the generated at least one spatial audio parameter and the at least one audio signals and the generated at least one audio source is selected based on a renderer preference.

20 Claims, 9 Drawing Sheets

METHOD AND APPARATUS FOR LOW COMPLEXITY LOW BITRATE 6DOF HOA RENDERING

FIELD

The present application relates to apparatus and methods for audio rendering with spatial metadata interpolation for audio scenes comprising higher order ambisonics sources at known positions, for users with 6 degrees of freedom.

BACKGROUND

Spatial audio capture approaches attempt to capture an audio environment such that the audio environment can be perceptually recreated to a listener in an effective manner and furthermore may permit a listener to move and/or rotate within the recreated audio environment. For example in some systems (3 degrees of freedom—3DoF) the listener may rotate their head and the rendered audio signals reflect this rotation motion. In some systems (3 degrees of freedom plus—3DoF+) the listener may 'move' slightly within the environment as well as rotate their head and in others (6 degrees of freedom—6DoF) the listener may freely move within the environment and rotate their head.

Linear spatial audio capture refers to audio capture methods where the processing does not adapt to the features of the captured audio. Instead, the output is a predetermined linear combination of the captured audio signals.

For recording spatial sound linearly at one position at the recording space, a high-end microphone array is needed. One such microphone is the spherical 32-microphone Eigenmike. From the high-end microphone array a higher-order Ambisonics (HOA) signals can be obtained and used for rendering. With the HOA signals, the spatial audio can be rendered so that sounds arriving from different directions are satisfactorily separated in a reasonable auditory bandwidth.

An issue for linear spatial audio capture techniques are the requirements for the microphone arrays. Short wavelengths (higher frequency audio signals) need small microphone spacing, and long wavelengths (lower frequency) need a large array size, and it is difficult to meet both conditions within a single microphone array.

Implementing linear spatial audio capture for capture devices results in a spatial audio obtained only for a single position.

Parametric spatial audio capture refers to systems that estimate perceptually relevant parameters based on the audio signals captured by microphones and, based on these parameters and the audio signals, a spatial sound may be synthesized. The analysis and the synthesis typically takes place in frequency bands which may approximate human spatial hearing resolution.

MPEG-I Immersive audio is being standardized. MPEG-I immersive audio is expected to receive 3 types of audio signal formats, objects, channels and HOA. One of the signal types employed in MPEG-I is higher order ambisonics (HOA) sources has benefits for scenarios where object audio capture is not feasible or too complex. HOA audio can be created from live capture or synthesized from a virtual scene comprising large number of objects. Multiple HOA sources representing a scene can be used to enable movement with six degrees of freedom. Typically, for scene based audio capture, one or more HOA sources are created by capturing the audio scene with suitable microphones (e.g., microphone arrays).

Rendering is a process wherein the captured audio signals (or transport audio signals derived from the captured audio signals) and parameters are processed to produce a suitable output for outputting to a listener, for example via headphones or loudspeakers or any suitable audio transducer.

SUMMARY

There is provided according to a first aspect an apparatus for generating an immersive audio scene, the apparatus comprising means configured to: obtain two or more audio scene based sources, the two or more audio scene based sources are associated with one or more positions in an audio scene, wherein each audio scene based source comprises at least one spatial parameter and at least one audio signal; determine at least one position associated with at least one of the obtained two or more audio scene based sources, wherein the at least one position is determined for rendering; generate at least one audio source based on the determined at least one position, wherein the means configured to generate the at least one audio source is configured to: generate at least one spatial audio parameter based on the at least one spatial parameter of the associated at least one of the obtained two or more audio scene based sources in relation to the determined at least one position; and generate at least one audio source signal for the at least one audio source based on the at least one audio signal of the obtained two or more audio scene based sources in relation to the determined at least one position; and generate information about a relationship between the generated at least one spatial audio parameter and the at least one audio signals associated with at least one of the obtained two or more audio scene based sources and the generated at least one audio source is selected based on a renderer preference.

The means configured to determine at least one position associated with at least one of the obtained two or more audio scene based sources may be configured to obtain the at least one position from at least one further apparatus, and the means may be further configured to: transmit the information to the at least one further apparatus; when selecting the two or more audio scene based sources outputting at least one spatial parameter and the at least one audio signal of the selected two or more sources; and when selecting the at least one audio source outputting the at least one spatial audio parameter of the audio source and the at least one audio source signal.

The means configured to select the the two or more audio scene based sources or the at least one audio source based on the one position from at least one further apparatus may be configured to select the the two or more audio scene based sources or the at least one audio source based on at least one of: a bandwidth of a transmission or storage channel between the apparatus and the further apparatus; and a computation capability of the further apparatus.

The means configured to generate at least one audio source based on the determined at least one position may be configured to determine a position of the at least one audio source based on the determined at least one position from the at least one further apparatus.

The means configured to generate at least one audio source based on the determined at least one position may be configured to: select or define a group of audio scene based sources within the two or more audio scene based sources; generate the at least one at least one spatial audio parameter based on a combination of the two or more audio scene based sources at least one spatial parameter from the selected or defined group of audio scene based sources within the two or more audio scene based sources; and generate the at least one audio source signal based on a combination of the two or more audio scene based sources at least one audio signal of from the selected or defined group of audio scene based sources within the two or more audio scene based sources.

The means configured to obtain two or more audio scene based sources may be configured to: obtain at least two audio signals from microphones located in the audio scene; and analyse the at least two audio signals to identify the two or more audio scene based sources and the at least one spatial parameter and the at least one audio signal associated with each of the two or more audio scene based sources.

The means configured to obtain two or more audio scene based sources may be configured to receive or synthesize the two or more audio scene based sources.

The two or more audio scene based sources may be higher order ambisonics sources.

The at least one audio source generated based on the determined at least one position may be a position interpolated higher order ambisonics source.

According to a second aspect there is provided an apparatus for spatial audio signal rendering, the apparatus comprising means configured to: obtain information about a relationship between a generated at least one spatial audio parameter and at least one audio signals associated with at least one of an obtained two or more audio scene based sources and generated at least one audio source; obtain a user position value and a user orientation value; request, based on the user position value, a selection of the generated at least one audio source and/or at least two of the two or more audio scene based sources; obtain at least one rendering source spatial parameter based on the request; obtain at least one rendering source audio signal based on the request; and generate at least one output audio signal based on the user orientation value, the at least one rendering source spatial parameter and the at least one rendering source audio signal.

The means configured to request, based on the user position value, a selection of the generated at least one audio source and/or at least two of the two or more audio scene based sources may be further configured to: determine at least one of: a bandwidth of a transmission or storage channel between the apparatus and a further apparatus from which the least one rendering source spatial parameter and the at least one rendering source audio signal is obtained; a computation capability of the apparatus; and select the at least one audio source or at least two of the two or more audio scene based sources based on the a bandwidth of a transmission or storage channel or the computation capability.

According to a third aspect there is provided a method for an apparatus for generating an immersive audio scene, the method comprising: obtaining two or more audio scene based sources, the two or more audio scene based sources are associated with one or more positions in an audio scene, wherein each audio scene based source comprises at least one spatial parameter and at least one audio signal; determining at least one position associated with at least one of the obtained two or more audio scene based sources, wherein the at least one position is determined for rendering; generating at least one audio source based on the determined at least one position, wherein generating the at least one audio source comprises: generating at least one spatial audio parameter based on the at least one spatial parameter of the associated at least one of the obtained two or more audio scene based sources in relation to the determined at least one position; and generating at least one audio source signal for the at least one audio source based on the at least one audio signal of the obtained two or more audio scene based sources in relation to the determined at least one position; and generating information about a relationship between the generated at least one spatial audio parameter and the at least one audio signals associated with at least one of the obtained two or more audio scene based sources and the generated at least one audio source is selected based on a renderer preference.

Determining at least one position associated with at least one of the obtained two or more audio scene based sources may comprise obtaining the at least one position from at least one further apparatus, and the method may further comprise: transmitting the information to the at least one further apparatus; when selecting the two or more audio scene based sources outputting at least one spatial parameter and the at least one audio signal of the selected two or more sources; and when selecting the at least one audio source outputting the at least one spatial audio parameter of the audio source and the at least one audio source signal.

Selecting the the two or more audio scene based sources or the at least one audio source based on the one position from at least one further apparatus comprises selecting the the two or more audio scene based sources or the at least one audio source based on at least one of: a bandwidth of a transmission or storage channel between the apparatus and the further apparatus; and a computation capability of the further apparatus.

Generating at least one audio source based on the determined at least one position may comprise determining a position of the at least one audio source based on the determined at least one position from the at least one further apparatus.

Generating at least one audio source based on the determined at least one position may comprise: selecting or defining a group of audio scene based sources within the two or more audio scene based sources; generating the at least one at least one spatial audio parameter based on a combination of the two or more audio scene based sources at least one spatial parameter from the selected or defined group of audio scene based sources within the two or more audio scene based sources; and generating the at least one audio source signal based on a combination of the two or more audio scene based sources at least one audio signal of from the selected or defined group of audio scene based sources within the two or more audio scene based sources.

Obtaining two or more audio scene based sources may comprise: obtaining at least two audio signals from microphones located in the audio scene; and analysing the at least two audio signals to identify the two or more audio scene based sources and the at least one spatial parameter and the at least one audio signal associated with each of the two or more audio scene based sources.

Obtaining two or more audio scene based sources may comprise receiving or synthesizing the two or more audio scene based sources.

The two or more audio scene based sources may be higher order ambisonics sources.

The at least one audio source generated based on the determined at least one position may be a position interpolated higher order ambisonics source.

According to a fourth aspect there is provided a method for an apparatus for spatial audio signal rendering, the method comprising: obtaining information about a relationship between a generated at least one spatial audio parameter and at least one audio signals associated with at least one of an obtained two or more audio scene based sources and generated at least one audio source; obtaining a user position value and a user orientation value; requesting, based on the user position value, a selection of the generated at least one audio source and/or at least two of the two or more audio scene based sources; obtaining at least one rendering source spatial parameter based on the request; obtaining at least one rendering source audio signal based on the request; and generating at least one output audio signal based on the user orientation value, the at least one rendering source spatial parameter and the at least one rendering source audio signal.

Requesting, based on the user position value, a selection of the generated at least one audio source and/or at least two of the two or more audio scene based sources may comprise: determining at least one of: a bandwidth of a transmission or storage channel between the apparatus and a further apparatus from which the least one rendering source spatial parameter and the at least one rendering source audio signal is obtained; a computation capability of the apparatus; and selecting the at least one audio source or at least two of the two or more audio scene based sources based on the a bandwidth of a transmission or storage channel or the computation capability.

According to a fifth aspect there is provided an apparatus for generating an immersive audio scene, the apparatus comprising at least one processor and at least one memory including a computer program code, the at least one memory and the computer program code configured to, with the at least one processor, cause the apparatus at least to: obtain two or more audio scene based sources, the two or more audio scene based sources are associated with one or more positions in an audio scene, wherein each audio scene based source comprises at least one spatial parameter and at least one audio signal; determine at least one position associated with at least one of the obtained two or more audio scene based sources, wherein the at least one position is determined for rendering; generate at least one audio source based on the determined at least one position, wherein the means configured to generate the at least one audio source is configured to: generate at least one spatial audio parameter based on the at least one spatial parameter of the associated at least one of the obtained two or more audio scene based sources in relation to the determined at least one position; and generate at least one audio source signal for the at least one audio source based on the at least one audio signal of the obtained two or more audio scene based sources in relation to the determined at least one position; and generate information about a relationship between the generated at least one spatial audio parameter and the at least one audio signals associated with at least one of the obtained two or more audio scene based sources and the generated at least one audio source is selected based on a renderer preference.

The apparatus caused to determine at least one position associated with at least one of the obtained two or more audio scene based sources may be caused to obtain the at least one position from at least one further apparatus, and the apparatus may be further caused to: transmit the information to the at least one further apparatus; when selecting the two or more audio scene based sources outputting at least one spatial parameter and the at least one audio signal of the selected two or more sources; and when selecting the at least one audio source outputting the at least one spatial audio parameter of the audio source and the at least one audio source signal.

The apparatus caused to select the the two or more audio scene based sources or the at least one audio source based on the one position from at least one further apparatus may be caused to select the the two or more audio scene based sources or the at least one audio source based on at least one of: a bandwidth of a transmission or storage channel between the apparatus and the further apparatus; and a computation capability of the further apparatus.

The apparatus caused to generate at least one audio source based on the determined at least one position may be caused to determine a position of the at least one audio source based on the determined at least one position from the at least one further apparatus.

The apparatus caused to generate at least one audio source based on the determined at least one position may be caused to: select or define a group of audio scene based sources within the two or more audio scene based sources; generate the at least one at least one spatial audio parameter based on a combination of the two or more audio scene based sources at least one spatial parameter from the selected or defined group of audio scene based sources within the two or more audio scene based sources; and generate the at least one audio source signal based on a combination of the two or more audio scene based sources at least one audio signal of from the selected or defined group of audio scene based sources within the two or more audio scene based sources.

The apparatus caused to obtain two or more audio scene based sources may be caused to: obtain at least two audio signals from microphones located in the audio scene; and analyse the at least two audio signals to identify the two or more audio scene based sources and the at least one spatial parameter and the at least one audio signal associated with each of the two or more audio scene based sources.

The apparatus caused to obtain two or more audio scene based sources may be caused to receive or synthesize the two or more audio scene based sources.

The two or more audio scene based sources may be higher order ambisonics sources.

The at least one audio source generated based on the determined at least one position may be a position interpolated higher order ambisonics source.

According to a sixth aspect there is provided an apparatus for spatial audio signal rendering, the apparatus comprising at least one processor and at least one memory including a computer program code, the at least one memory and the computer program code configured to, with the at least one processor, cause the apparatus at least to: obtain information about a relationship between a generated at least one spatial audio parameter and at least one audio signals associated with at least one of an obtained two or more audio scene based sources and generated at least one audio source; obtain a user position value and a user orientation value; request, based on the user position value, a selection of the generated at least one audio source and/or at least two of the two or more audio scene based sources; obtain at least one rendering source spatial parameter based on the request; obtain at least one rendering source audio signal based on the request; and generate at least one output audio signal based on the user orientation value, the at least one rendering source spatial parameter and the at least one rendering source audio signal.

The apparatus caused to request, based on the user position value, a selection of the generated at least one audio source and/or at least two of the two or more audio scene based sources may be further caused to: determine at least one of: a bandwidth of a transmission or storage channel between the apparatus and a further apparatus from which the least one rendering source spatial parameter and the at least one rendering source audio signal is obtained; a computation capability of the apparatus; and select the at least one audio source or at least two of the two or more audio scene based sources based on the a bandwidth of a transmission or storage channel or the computation capability.

According to a seventh aspect there is provided an apparatus for generating a spatialized audio output based on a user position, the apparatus comprising: means for obtaining two or more audio scene based sources, the two or more audio scene based sources are associated with one or more positions in an audio scene, wherein each audio scene based source comprises at least one spatial parameter and at least one audio signal; means for determining at least one position associated with at least one of the obtained two or more audio scene based sources, wherein the at least one position is determined for rendering; means for generating at least one audio source based on the determined at least one position, wherein the means for generating the at least one audio source comprises: means for generating at least one spatial audio parameter based on the at least one spatial parameter of the associated at least one of the obtained two or more audio scene based sources in relation to the determined at least one position; and means for generating at least one audio source signal for the at least one audio source based on the at least one audio signal of the obtained two or more audio scene based sources in relation to the determined at least one position; and means for generating information about a relationship between the generated at least one spatial audio parameter and the at least one audio signals associated with at least one of the obtained two or more audio scene based sources and the generated at least one audio source is selected based on a renderer preference.

According to an eighth aspect there is provided an apparatus for generating a spatialized audio output based on a user position, the apparatus comprising: means for obtaining information about a relationship between a generated at least one spatial audio parameter and at least one audio signals associated with at least one of an obtained two or more audio scene based sources and generated at least one audio source; means for obtaining a user position value and a user orientation value; means for requesting, based on the user position value, a selection of the generated at least one audio source and/or at least two of the two or more audio scene based sources; means for obtaining at least one rendering source spatial parameter based on the request; means for obtaining at least one rendering source audio signal based on the request; and means for generating at least one output audio signal based on the user orientation value, the at least one rendering source spatial parameter and the at least one rendering source audio signal.

According to a ninth aspect there is provided a computer program comprising instructions [or a computer readable medium comprising program instructions] for causing an apparatus, to perform at least the following: obtain two or more audio scene based sources, the two or more audio scene based sources are associated with one or more positions in an audio scene, wherein each audio scene based source comprises at least one spatial parameter and at least one audio signal; determine at least one position associated with at least one of the obtained two or more audio scene based sources, wherein the at least one position is determined for rendering; generate at least one audio source based on the determined at least one position, wherein the generation of the at least one audio source can perform the following: generate at least one spatial audio parameter based on the at least one spatial parameter of the associated at least one of the obtained two or more audio scene based sources in relation to the determined at least one position; and generate at least one audio source signal for the at least one audio source based on the at least one audio signal of the obtained two or more audio scene based sources in relation to the determined at least one position; and generate information about a relationship between the generated at least one spatial audio parameter and the at least one audio signals associated with at least one of the obtained two or more audio scene based sources and the generated at least one audio source is selected based on a renderer preference.

According to a ninth aspect there is provided a computer program comprising instructions [or a computer readable medium comprising program instructions] for causing an apparatus to perform at least the following: obtain information about a relationship between a generated at least one spatial audio parameter and at least one audio signals associated with at least one of an obtained two or more audio scene based sources and generated at least one audio source; obtain a user position value and a user orientation value; request, based on the user position value, a selection of the generated at least one audio source and/or at least two of the two or more audio scene based sources; obtain at least one rendering source spatial parameter based on the request; obtain at least one rendering source audio signal based on the request; and generate at least one output audio signal based on the user orientation value, the at least one rendering source spatial parameter and the at least one rendering source audio signal.

According to an eleventh aspect there is provided a non-transitory computer readable medium comprising program instructions for causing an apparatus to perform at least the following: obtain two or more audio scene based sources, the two or more audio scene based sources are associated with one or more positions in an audio scene, wherein each audio scene based source comprises at least one spatial parameter and at least one audio signal; determine at least one position associated with at least one of the obtained two or more audio scene based sources, wherein the at least one position is determined for rendering; generate at least one audio source based on the determined at least one position, wherein the generation the at least one audio source caused the apparatus to perform: generate at least one spatial audio parameter based on the at least one spatial parameter of the associated at least one of the obtained two or more audio scene based sources in relation to the determined at least one position; and generate at least one audio source signal for the at least one audio source based on the at least one audio signal of the obtained two or more audio scene based sources in relation to the determined at least one position; and generate information about a relationship between the generated at least one spatial audio parameter and the at least one audio signals associated with at least one of the obtained two or more audio scene based sources and the generated at least one audio source is selected based on a renderer preference.

According to a twelfth aspect there is provided a non-transitory computer readable medium comprising program instructions for causing an apparatus to perform at least the following: obtain information about a relationship between a generated at least one spatial audio parameter and at least one audio signals associated with at least one of an obtained two or more audio scene based sources and generated at least one audio source; obtain a user position value and a user orientation value; request, based on the user position value, a selection of the generated at least one audio source and/or at least two of the two or more audio scene based sources; obtain at least one rendering source spatial parameter based on the request; obtain at least one rendering source audio signal based on the request; and generate at least one output audio signal based on the user orientation value, the at least one rendering source spatial parameter and the at least one rendering source audio signal.

According to a thirteenth aspect there is provided an apparatus comprising: obtaining circuitry configured to obtain two or more audio scene based sources, the two or more audio scene based sources are associated with one or more positions in an audio scene, wherein each audio scene based source comprises at least one spatial parameter and at least one audio signal; determining circuitry configured to determine at least one position associated with at least one of the obtained two or more audio scene based sources, wherein the at least one position is determined for rendering; generate at least one audio source based on the determined at least one position, wherein the generating circuitry configured to generate the at least one audio source is configured to: generate at least one spatial audio parameter based on the at least one spatial parameter of the associated at least one of the obtained two or more audio scene based sources in relation to the determined at least one position; and generate at least one audio source signal for the at least one audio source based on the at least one audio signal of the obtained two or more audio scene based sources in relation to the determined at least one position; and generating circuitry configured to generate information about a relationship between the generated at least one spatial audio parameter and the at least one audio signals associated with at least one of the obtained two or more audio scene based sources and the generated at least one audio source is selected based on a renderer preference.

According to a fourteenth aspect there is provided an apparatus comprising: obtaining circuitry configured to obtain information about a relationship between a generated at least one spatial audio parameter and at least one audio signals associated with at least one of an obtained two or more audio scene based sources and generated at least one audio source; obtain a user position value and a user orientation value; requesting circuitry configured to request, based on the user position value, a selection of the generated at least one audio source and/or at least two of the two or more audio scene based sources; obtaining circuitry configured to obtain at least one rendering source spatial parameter based on the request; obtaining circuitry configured to obtain at least one rendering source audio signal based on the request; and generating circuitry configured to generate at least one output audio signal based on the user orientation value, the at least one rendering source spatial parameter and the at least one rendering source audio signal.

According to a fifteenth aspect there is provided a computer readable medium comprising program instructions for causing an apparatus to perform at least the following: obtain two or more audio scene based sources, the two or more audio scene based sources are associated with one or more positions in an audio scene, wherein each audio scene based source comprises at least one spatial parameter and at least one audio signal; determine at least one position associated with at least one of the obtained two or more audio scene based sources, wherein the at least one position is determined for rendering; generate at least one audio source based on the determined at least one position, wherein the generation the at least one audio source caused the apparatus to perform: generate at least one spatial audio parameter based on the at least one spatial parameter of the associated at least one of the obtained two or more audio scene based sources in relation to the determined at least one position; and generate at least one audio source signal for the at least one audio source based on the at least one audio signal of the obtained two or more audio scene based sources in relation to the determined at least one position; and generate information about a relationship between the generated at least one spatial audio parameter and the at least one audio signals associated with at least one of the obtained two or more audio scene based sources and the generated at least one audio source is selected based on a renderer preference.

According to a sixteenth aspect there is provided a computer readable medium comprising program instructions for causing an apparatus to perform at least the following: obtain information about a relationship between a generated at least one spatial audio parameter and at least one audio signals associated with at least one of an obtained two or more audio scene based sources and generated at least one audio source; obtain a user position value and a user orientation value; request, based on the user position value, a selection of the generated at least one audio source and/or at least two of the two or more audio scene based sources; obtain at least one rendering source spatial parameter based on the request; obtain at least one rendering source audio signal based on the request; and generate at least one output audio signal based on the user orientation value, the at least one rendering source spatial parameter and the at least one rendering source audio signal.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Multipoint-higher order ambisonics (MPHOA) rendering is typically computationally heavy. The rendering process requires audio signals from multiple higher order ambisonics (HOA) audio sources. This typically results in higher bandwidth requirements in order to transport the audio signals from the multiple audio sources.

Current defined systems require typically 3 HOA source audio signals as well as 3 to 5 HOA source spatial metadata sets (for example when a listener position is at a border of two triangles formed by 5 HOA sources) to be delivered.

Thus currently higher order ambisonics based systems require significant computing capabilities as well as significant bandwidth.

Figure 1:
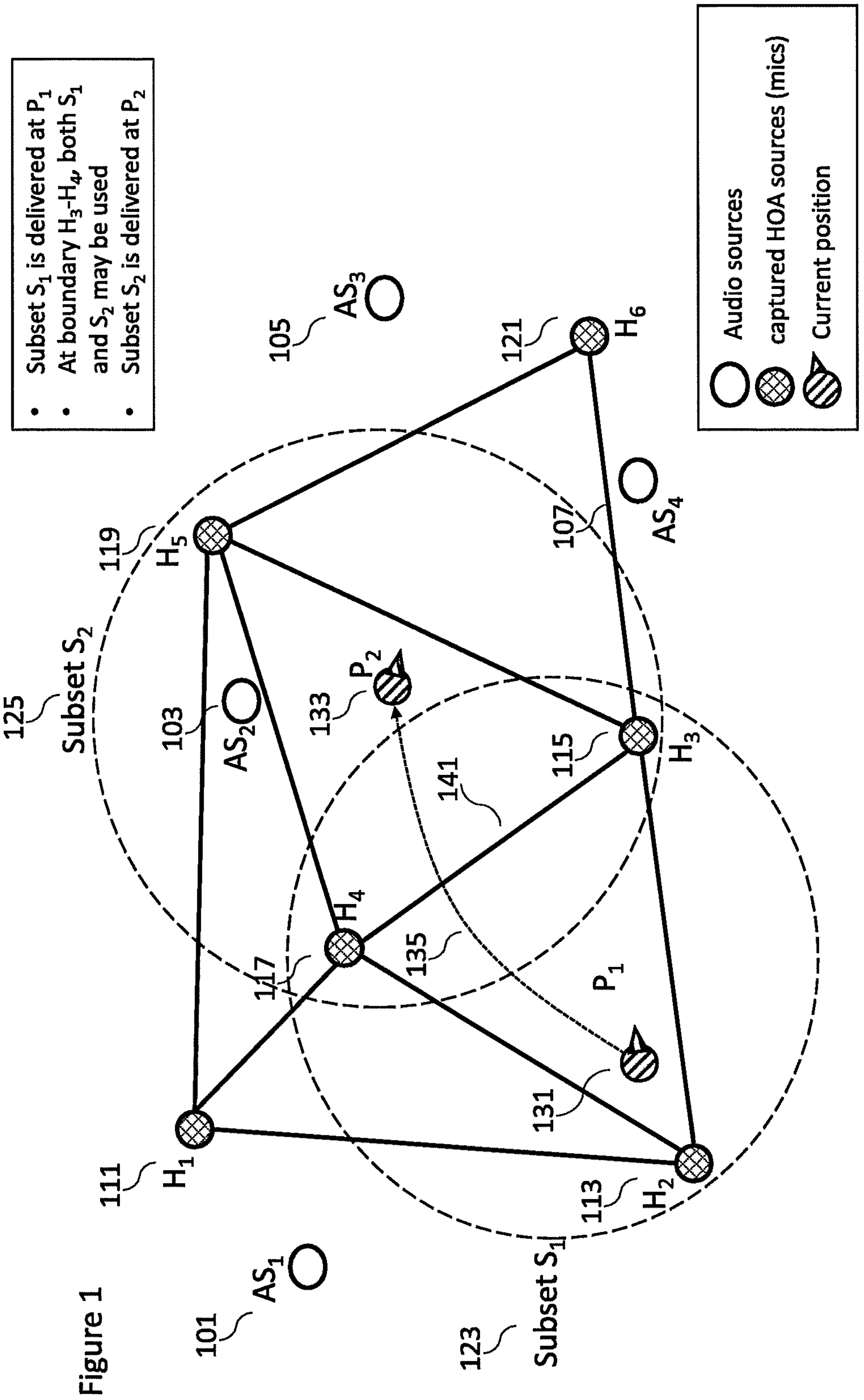
FIG. 1 shows schematically a scenario audio scene within which embodiments may be implemented.

For example as shown in FIG. 1 is shown an example scenario in which embodiments may be employed and produce advantages over the current approaches. In FIG. 1 there are shown four audio sources, a first audio source $AS_1$ 101, a second audio source $AS_2$ 103, a third audio source $AS_3$ 105, and a fourth audio source $AS_4$ 107 in the audio scene and which can be captured by 6 microphones (or microphone arrays) to create the captured higher order ambisoncs (HOA) sources: a first HOA source $H_1$ 111, a second HOA source $H_2$ 113, a third HOA source $H_3$ 115, a fourth HOA source $H_4$ 117, a fifth HOA source $H_5$ 119, and a sixth HOA source $H_6$ 121. In the following examples there can be defined a first subset $S_1$ 123 of HOA sources comprising the HOA sources $H_2$ 113, $H_3$ 115, $H_4$ 117 and a second subset $S_2$ 125 of HOA sources comprising the HOA sources comprises $H_3$ 115, $H_4$ 117, and $H_5$ 119. Depending on the listener position tracing the path represented by a curved line joining listening position $P_1$ 131 and $P_2$ 133, the renderer will require 3-5 HOA sources spatial metadata and audio signal data. Although the example describes captured HOA sources, in some embodiments a synthetic HOA source can also be present.

Figure 2:
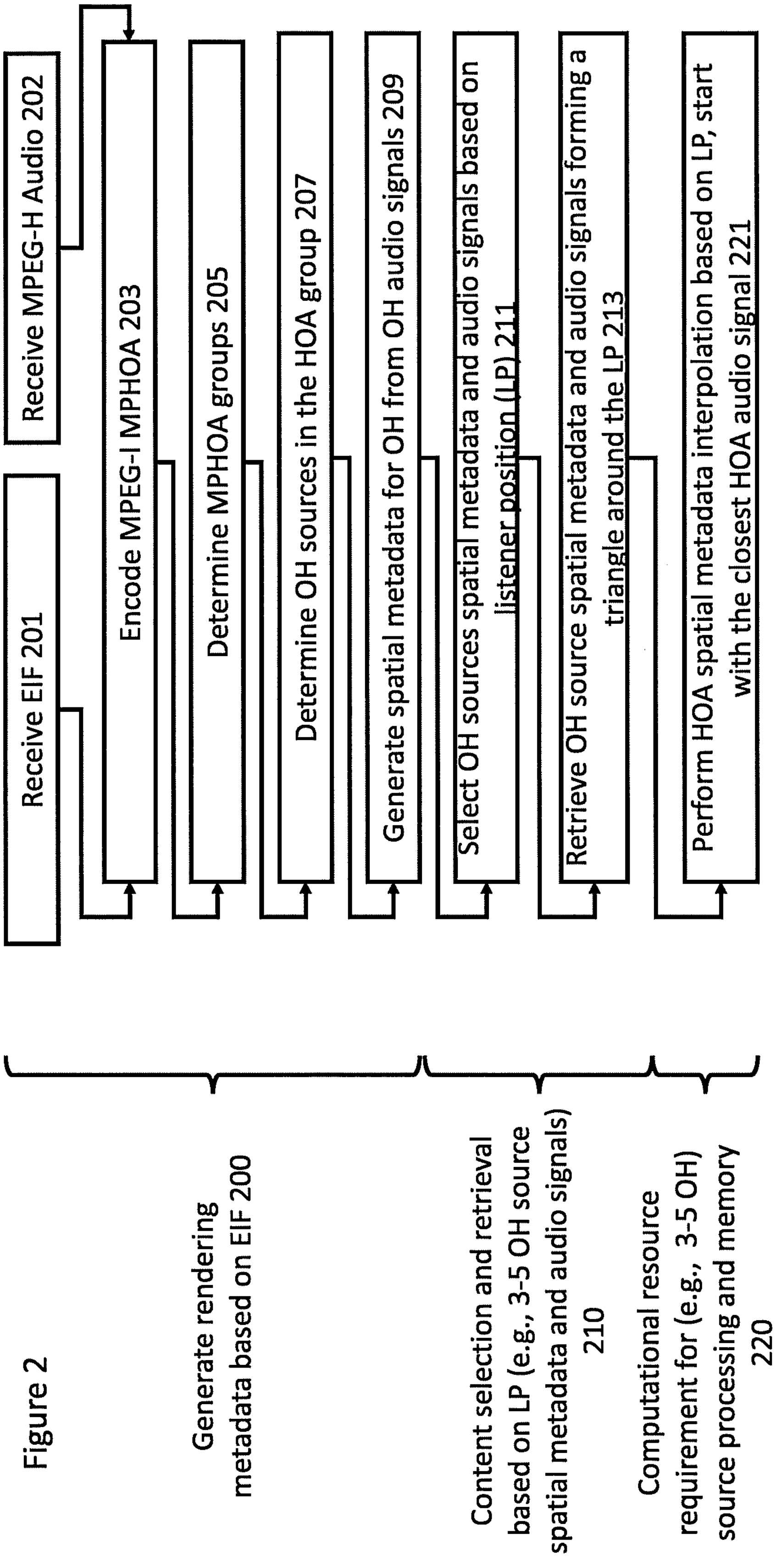
FIG. 2 shows an flow diagram of an example of current operations employed in rendering 6 degree-of-freedom higher order ambisonics.

With respect to FIG. 2 is shown a current method employed to render the 6DoF HOA system.

First, as shown in FIG. 2 by step 201, is the receiving or otherwise obtaining the encoder input format (EIF) information. The EIF (Encoder Input Format) is a form of content creator specified audio scene description. The HOA sources $H_1$, $H_2$, $H_3$, $H_4$ and $H_5$ are included in the EIF (or any equivalent content creator scene description).

Furthermore, as shown in FIG. 2 by step 202, is the receiving or otherwise obtaining the MPEG-H or other format audio signal data.

The EIF and the audio signal data is delivered to a MPEG-I MPHOA encoder as shown in FIG. 2 by step 203.

The encoder is then, as shown in FIG. 2 by step 205, configured to parse the EIF to determine the number of HOA groups which are to be processed together for performing MPHOA processing for enabling listener movement with six degrees of freedom.

The encoder can then, as shown in FIG. 2 by step 207, be configured to determine the higher order ambisonic sources (OH) in the HOA groups.

Following on the encoder is configured to process each of the HOA sources to generate spatial metadata required for 6DOF rendering. The generation of the spatial metadata for the higher order ambisonic sources from the higher order ambisonics audio signals is shown in FIG. 2 by step 209.

These operations can be summarized as the operations which then generate rendering metadata based on EIF as shown in FIG. 2 by reference 200.

The HOA sources in the EIF are referred to as original HOA sources because they are defined in the EIF by the content creator.

The (playback device) player, as shown in FIG. 2 by step 211, is configured to select the HOA sources spatial metadata and audio signals based on the listener position (LP).

With reference to the scenario shown in FIG. 1, where the listener is at position $P_1$ 131 the selection of the sources is subset $S_1$ 123 and at position $P_2$ 133 the selection is subset $S_2$ 125. The selection of OH sources spatial metadata and audio signals based on listener position (LP) is shown in FIG. 2 by step 211.

The selected content is then retrieved. Typically this operation consumes a significant amount of the bandwidth. The operation of retrieving the OH source spatial metadata and audio signals forming a triangle around the LP is shown in FIG. 2 by step 213.

The steps 211 and 213 can be summarized as content selection and retrieval based on LP (3-5 OH source spatial metadata and audio signals) as shown in FIG. 2 by step 210.

Subsequently, the retrieved subset is then input for render processing on the playback or rendering device. The performing HOA spatial metadata interpolation based on LP, starting with the closest HOA audio signal is shown in FIG. 2 by step 221. This rendering processing is the computationally intensive operation due to the processing involving data from multiple HOA sources. The step 221 can be summarized as the computational resource requirement for spatial metadata interpolation from 3 to 5 OH source in terms of processing and memory.

In the following description an original higher order ambisonics sources (OH sources) are HOA or scene based audio which are provided by the content creator as part of creating the audio scene. The original HOA (OH) sources can either be generated from microphones (or a microphone array) capturing the scene from one or more positions in the audio scene. The HOA sources can also be generated synthetically from a set of audio objects. Since the OH sources are the ones introduced in the scene during content creation they are present in the audio scene description. In the MPEG-I Immersive audio standardization scope, the content creator audio scene description is the EIF (encoder input format).

Furthermore in the following description the Position interpolated HOA sources (PIH sources) are the HOA sources generated as part of creating the rendering metadata for greater flexibility in terms of content consumption choices. The PIH sources are introduced during the 6DOF rendering metadata creation phase by the MPEG-I encoder and consequently, the PIH sources are not present in the content creator scene description or EIF in the MPEG-I Immersive audio standardization scope. However, the PIH sources are present in the MPEG-I bitstream available to the MPEG-I player for content selection and retrieval.

The concept as shown in the following embodiments describes a method and apparatus that requires a reduced rendering computation and network bandwidth for 6DOF rendering for a scene comprising multiple original HOA (OH) sources by generating additional position interpolated HOA (PIH) sources (with spatial metadata) during the rendering metadata creation stage and generating associated HOA source audio information for the PIH sources to enable 6DoF translation rendering with only a single HOA source.

The pre-generated PIH sources and associated metadata can be hosted by content distribution servers along with the OH sources. Consequently, the renderers or players can directly retrieve the appropriate PIH sources and the indicated audio signal. This results in lower computation comprising a single HOA source metadata processing (instead of the 3 typically HOA source metadata) and reduced bandwidth due to the need to retrieve only a single HOA source spatial metadata and associated OH source audio signal.

The low complexity low bandwidth translation playback can thus in some embodiments be achieved by:

generating one or more PIH sources comprising interpolated spatial metadata from the OH audio signal during rendering metadata creation;

determining at least one HOA audio signal associated with each of the PIH sources based on at least one criteria (e.g., closest to the PIH source position, second closest but closer to another neighbouring PIH source);

generating association information between PIH spatial metadata and the HOA audio signal; and generating the HOA source information comprising OH and PIH indication to the renderer.

In some embodiments, the PIH source and OH source metadata are indicated in the media presentation description (or manifest) to enable content selection for Dynamic Adaptive Streaming over HTTP (DASH) based delivery.

In some embodiments, the renderer can be configured to operate in different modes depending on the bandwidth and/or computational resource constraints. In some embodiments there can be three modes:

Mode 1: Rendering with 2 or more OH source spatial metadata and audio signals

Mode 2: Rendering with single OH source spatial metadata and associated OH audio signal with limited 6DoF Mode 3: Rendering with closest single OH or PIH source spatial medata and associated OH audio signal with 3DoF rendering.

Mode 1 provides greater freedom in terms of user movement. The mode 2 allows lesser freedom in terms of user movement compared to mode 1, however, it also requires low computational complexity and lower bandwidth compared to mode 1. The mode 3 has the lowest computational requirements compared to mode 1 and mode 2, however, it expects availability of OH and PIH sources in the expected listening positions. In case the listener position hotspots are known, the MPEG-I encoder can generate the PIH sources in the appropriate LPs. In an embodiment of the invention implementation, the content processing server (i.e. hosting the MPEG-I encoder) regularly updates the PIH sources available based on the crowdsourced content consumption hotspots derived by LP traces which are collected from user movements. In any of the modes described above, the player can perform rendering in all the 3 modes in an equivalent manner to the PIH sources. The need for additional PIH sources is due to the limited user translation without significant loss of audio quality with single PIH rendering (limited 6DoF) compared to the use of OH sources subsets for full 6DoF.

In employing the embodiments as described herein MPHOA rendering bandwidth can be reduced by up to a third. Furthermore MPHOA rendering on computationally constrained consumption devices can enable low end devices to become target addressable markets for 6DoF MPHOA rendering.

In the embodiments described herein there can be implemented a trade between computational complexity and network bandwidth requirement at the renderer/player by utilizing additional storage and pre-computation at the server.

As such this can solution enables devices to be flexibly configured in rendering complex scenes.

In the embodiments the generation of position interpolated HOA or Position interpolated HOA (PIH) sources with the help of OH sources and adding the suitable OH audio source information during 6DoF rendering metadata creation phase is a concept not currently discussed elsewhere. As indicated above this shifts the computational complexity from the renderer to the content processing or content hosting (e.g., DASH server which hosts the PIH source spatial metadata) without having any impact on content creation.

Furthermore the concept as discussed herein is configured to indicate the signaling of a single OH audio source which significantly reduces the need for delivery of multiple HOA source audio signal data.

Although the concept and the embodiments are suitable for implementation within the MPEG standard, this technique can be applied to other formats and for spatial audio capture content. Furthermore the embodiments as discussed herein are configured such that there is no requirement to alter audio signal data but only annotate the use of the best suited one.

Figure 3:
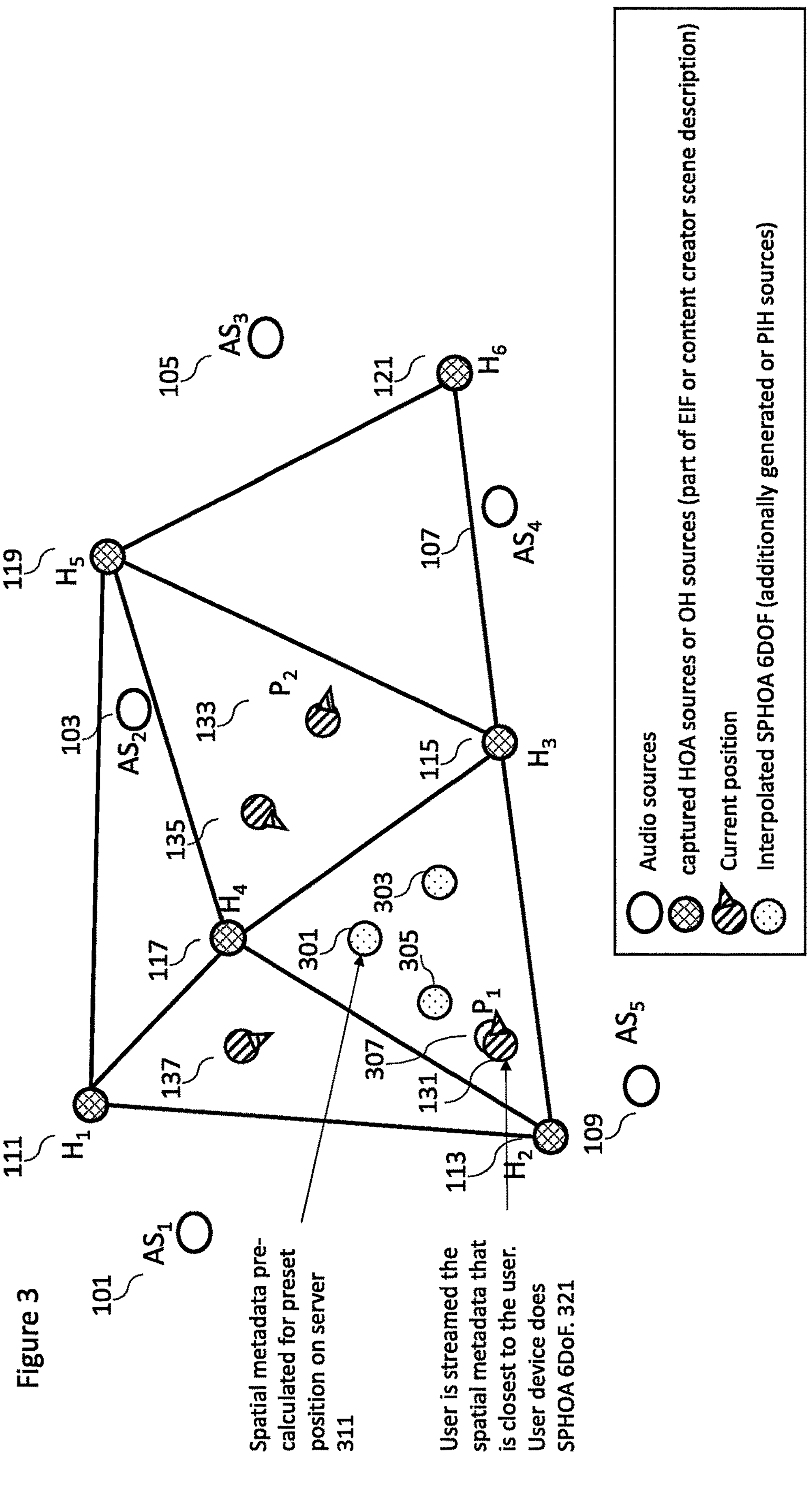
FIG. 3 shows schematically the scenario audio scene as shown in FIG. 1 with additional position interpolated higher order ambisonics sources within which embodiments may be implemented.

The invention concept is illustrated with respect to FIG. 3 which shows the scene as shown in FIG. 1. However in this example scene there is also a further fifth audio source $AS_5$ 109 and further positions for the listener device 135 and 137. The scene further comprises (Position interpolated HOA) PIH sources 301, 303 305, and 307. The PIH sources create additional listening positions where the renderer can perform rendering by retrieving only a single HOA source spatial metadata and single HOA source audio signal data.

Figure 4:
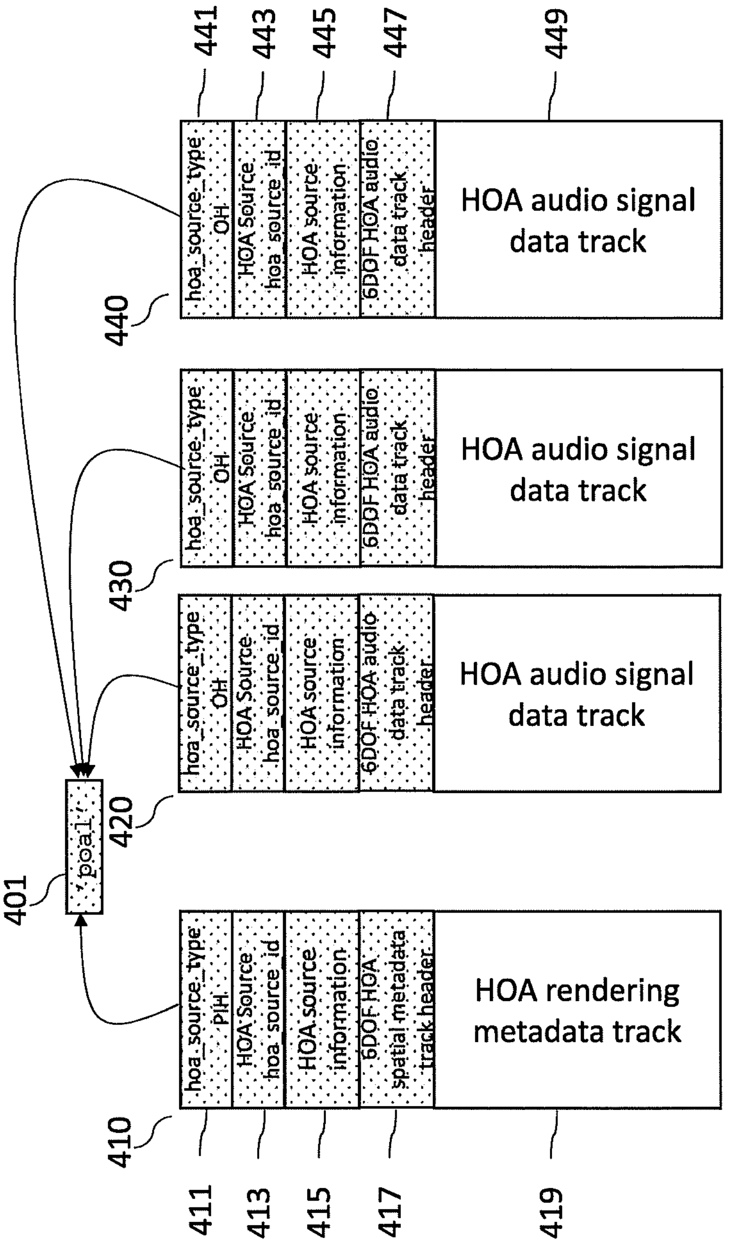
FIG. 4 shows schematically data structures for higher order ambisonic sources and position interpolated higher order ambisonics sources as shown in FIG. 3 according to some embodiments.

With respect to FIG. 4 is shown an example data structure for a PIH source 410 and the HOA sources 420, 430, 440 which are associated with a scene label 401 'poal'.

In this example the data structure for an OH (HOA) source such as sources 420, 430 and 440 is as follows:

a source type identifier (hoa_source_type OH) 441;

a unique source identifier (hoa_source_id) 443;

a HOA source information 445;

a 6DOF HOA audio data track header 447; and a HOA audio signal data track 449.

The data structure for a PIH source such as source 410 in this example is as follows:

a source type identifier (hoa_source_type PIH) 411;

a unique source identifier (hoa_source_id) 413;

a HOA source information 415;

a 6DOF HOA spatial metadata track header 417; and a HOA rendering metadata track 419.

Figure 5:
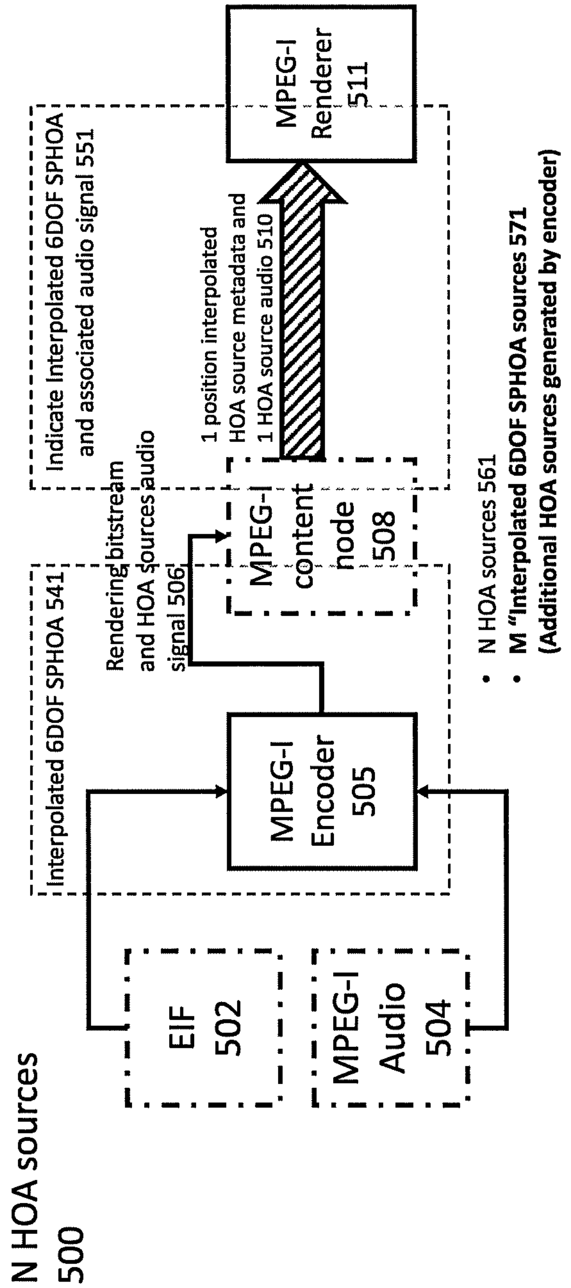
FIG. 5 shows an example apparatus within which some embodiments can be employed.

With respect to FIG. 5 is shown an example system of apparatus suitable for implementing some embodiments.

In this example the system comprises a EIF 502 input which is configured to be passed to the encoder (in this example a MPEG-I encoder 505).

Additionally the system comprises a MPEG-I audio 504 input which is configured to be passed to the encoder 505.

The system further comprises an (MPEG-I) encoder 505. The encoder 505 is configured to receive the (MPEG-I) audio 504 and EIF 502 and generate rendering metadata from the received scene description (EIF) and audio raw signals.

In some embodiments the encoder uses the scene description information (EIF) to detect or determine the presence of one or more HOA groups. Each HOA group comprises two or more HOA sources. The HOA sources specified by the content creator in the EIF information are referred to original HOA sources or OH sources.

Furthermore the encoder 505 is configured to determine at least one candidate position for the generation of additional position interpolated HOA sources (PIH sources).

The encoder 505 in some embodiments performs spatial metadata interpolation using the OH sources encompassing each of the candidate PIH sources to generate the position interpolated spatial metadata. The method for performing spatial metadata interpolation can be as discussed in GB application 2002710.8.

In some embodiments the encoder further is configured to determine an audio signal from the one or more OH sources used to calculate the PIH spatial metadata used.

For examine in some embodiments, the closest OH source audio signal is added as associated OH source audio signal with the particular PIH source.

In some embodiments the encoder is configured to select the OH source audio signal such that it is also an associated audio signal for also the neighbouring PIH sources. Such an approach will allow the player/renderer to retrieve a longer duration of audio content to ensure seamless operation in response to listener movement.

The number of identified or determined listener positions can in some embodiments depend on the number of OH sources and the distances between the OH sources.

Furthermore in some embodiments the determined number of PIH sources depends on the amount of translation that will be permitted. The number of PIH sources depend on the tradeoff between extent of permitted translation for each PIH source and an acceptable storage size.

For example and for simplicity where microphones are positioned in an arrangement which describes equilateral triangles (with respect to each microphone in an audio scene). The area of a triangle is given by equation as follows:

$$\text{Area } A = \left(\frac{\sqrt[2]{3}}{4}\right) * a\hat{\ }2;$$

where a is the length of the side of the triangle.

If a PIH source is embedded in between the OH sources such that each PIH source allows one sixth translation distance will result in area covered for 6DoF rendering by each PIH source=(a/d)^2*π; where d>1. Typically parametric rendering of the single PIH source retains high quality for limited translation with noticeable degradation as d approaches 1.

$$\text{Number of } PIH \text{ sources to cover the } A \text{ is } NumPIH = \left(\left(\frac{\sqrt[2]{3}}{4}\right) * a^2\right) / \left(\left(\frac{a}{d}\right)^2 * \pi\right);$$

An a=3m would result in A=3.9 sqm. For PIH allowing 0.5m of translation (i.e. d=6), the number of PIH sources required is in this example 5.

The definition for an equilateral triangle can be extended to any triangle.

In some embodiments the inter-PIH-distance can be determined such that the additional storage space required is the limiting constraint.

Furthermore in some embodiments, only a subset of the OH sources are embedded with PIH sources. For example this subset implementation can be employed in large audio scenes where additional data storage with PIH sources is controlled based on the listener position heatmaps.

Furthermore this sub-set selection can be further customized based on CDNs (content delivery networks) hosting the rendering metadata and audio signal data to customize for individual regions.

In some embodiments the HOA source information for the OH sources can be as follows:

```
aligned(8) HOASourceInformationStruct( ){
  unsigned int(2) hoa_source_type; //OH or PIH source
  HOASourcePositionStruct( ); //position of the HOA source
  unsigned int(16) hoa_source_id; //unique identifier for
each HOA source
  unsigned int(3) hoa_order; //order of HOA source
  bit (3) reserved = 0;
  HOAGroupInformationStruct( ); //grouping information of
the HOA source
}
  aligned(8) HOAGroupInformationStruct( ){
  unsigned int(16) hoa_source_group_id; //Unique HOA
group identifier
}
```

| hoa_source_type | Semantics |
|---|---|
| 0 | By default the value is OH source or original source. In absence of this flag value, OH source can be assumed. |
| 1 | Position interpolated HOA source, generated as a position interpolated spatial metadata represented generated from two or more OH sources spatial metadata. |
| 2-3 | Reserved |

As shown in FIG. 4 a grouping of OH sources, PIH sources and OH audio signals that are credible alternatives for rendering 401 can be defined using a EntityToGroupBox with grouping_type equal to 'poal' (PIH and OH source audio alternatives) which specifies tracks containing PIH source metadata and the associated alternative OH audio signals are included in the same entity group.

```
aligned(8) class HOASourceOHAudioAlternativesBox(version,
flags) extends EntityToGroupBox('poal', version, flags) {
  // conditionally mandatory
  for(i=0; i<num_entities_in_group; i++)
    unsigned int(16) ref_ohaudio_id[i];
}
```

In this example ref_ohaudio_id[1] specifies the hoa_source_id from the track identified by i-th entity_id that is a credible audio signal for rendering the PIH source in this group. The entity_id for the OH audio signal suitable for rendering the PIH source is ordered such that the smallest index is the highest preference. The OH identified by ref_ohaudio_id[0] is the most preferred OH audio signal source. The i-th referenced track can have hoa_source_id equal to ref_ohaudio_id[i] present. In case of a single audio signal being suitable the number of entities can be absent.

In some embodiments an implementation embodiment, the 6DOF OH sources are indicated by signaling HOASourceInformationStruct( ) as a new box—6DOFOHSourceBox('6dohb') to be contained in the sample entry of the spatial rendering metadata tracks and carries information about the associated OH audio signal data.

```
aligned(8) 6DOFHOABox( ) extends FullBox('6dhb',0,flags) {
#container: AudioSampleEntry or Timed metadata. New
definition
```

-continued

```
    HOASourceInformationStruct( );
  unsigned int(1) hoa_source_audio_or_render_meta;
    bit(7) reserved = 0;
}
```

In some embodiments the (MPEG-I) encoder 505 is further configured to render or generate metadata manifest for content selection.

In some embodiments the generation of metadata manifest for content selection is such that for a DASH Media Presentation Description (MPD), an HOA source element with a @schemeIdUri attribute equal to "urn:mpeg:mpegI:mia:2021:6DOH" is referred to as a original HOA source (OH source defined in EIF), 6DOH descriptor. Furthermore a HOA source as described in HOASourceInformationStruct( ), where the hoa_source_type value is equal to 0.

Also a HOA source element with @schemeIdUri attribute equal to "urn:mpeg:mpegI:mia:2021:6DPH" is referred to as a position interpolated HOA source (PIH source), 6DPH descriptor. A HOA source as described in HOASourceInformationStruct( ), where the hoa_source_type value is equal to 1.

In some embodiments the number of 6DOH adaptation sets are present for data (audio signal data and spatial metadata) for each of the OH sources in the content creator scene description. Similarly, if there are one or more PIH sources added during the rendering metadata creation phase, they are present as adaptation sets with 6DPH descriptor corresponding to each of the interpolated spatial metadata representation.

In absence of any PIH sources, the rendering is performed using only the OH sources (audio and spatial metadata). In presence of PIH sources in the media manifest, the player has the freedom to select the appropriate adaptation set for retrieval and playback depending on the computational resources on the rendering device and the bandwidth availability.

The 6DOH and 6DPH descriptor in some embodiments shall include an @value attribute and a HOASourceInfo element with its sub-elements and attributes as specified in the following Table.

| Elements and attributes for HOA source descriptor | Use | Data type | Description |
|---|---|---|---|
| @value | M | xs:string | Specifies the hoa_source_id of the HOA source in the audio scene. The value is a string that contains a base-10 integer representation of a HOA source ID. In case of multiple or "N" HOA source IDs packed in a single frame, this can be a whitespace-separated list of HOA source IDs as indicated by hoa_source_id. |
| HOA_Source_Position.HOA_Source_Position_X | 1 . . . N | xs:string | X coordinate Position of HOA source, or a whitespace-separated list of X position of the HOA sources listed in the @value. The number of position values shall be equal to the number of hoa_source_id listed in @value field. This information is 1 is there is only one HOA source in one adaptation set, N if there are N HOA sources packaged in the same DASH segment. |
| HOA_Source_Position.HOA_Source_Position_Y | 1 . . . N | xs:string | Y coordinate Position of HOA source, or a whitespace-separated list of Y position of the HOA sources listed in the @value. The number of position values shall be equal to the number of hoa_source_id listed in @value field. This information is 1 is there is only one HOA source in one adaptation set, N if there are N HOA sources packaged in the same DASH segment. |

-continued

| Elements and attributes for HOA source descriptor | Use | Data type | Description |
|---|---|---|---|
| HOA_Source_Position.HOA_Source_Position_Z | 1 . . . N | xs:string | Z coordinate Position of HOA source, or a whitespace-separated list of Z position of the HOA sources listed in the @value. The number of position values shall be equal to the number of hoa_source_id listed in @value field. This information is 1 is there is only one HOA source in one adaptation set, N if there are N HOA sources packaged in the same DASH segment. |
| Associated_HOA_AudioSignalSources.List. | O | xs:string | List of hoa_source_id of the OH sources which can be used for rendering the HOA source. This information can be present for both OH and PIH sources, thus present in both 6DOF and 6DPH descriptors. This information is optional. It is provided by the content creator to faciliate the client to retrieve audio signals for HOA rendering. The list facilitates greater flexibility for potential reuse of already retrieved audio signal data. |
| TranslationExtentRadius | O | int | Specified as radius in meters of a sphere for the recommended listener freedom of movement away from the HOA source. This information is optional. This information can be determined by the player in absence of this information. |
| HOA_Source_Group_Info.groupId | CM | int | This attribute specifies the identifier of the HOA source group that this HOA source belongs to. This information is conditionally mandatory if there are HOA sources belonging to more than one group in the MPD. |

In some embodiments another manifest implementation approach comprises a single descriptor for all HOA sources (OH and PIH). The Media Presentation Description (MPD) in such embodiments has an additional mandatory parameter hoa_source_type to indicate whether the adaptation set is representing an OH source or whether it represents a PIH source.

In some embodiments, the OH and PIH sources are listed as attributes in JavaScript Object Notation (JSON) format. This can be useful when delivery methods other than DASH are used. Depending on the delivery method preference, Session Description Protocol (SDP) can also be used to describe the available HOA sources. This can be of benefit for broadcast as well as multicast distribution of content. In such scenarios, the player can select approach streams representing the OH or PIH sources to perform the 6DOF rendering.

Having generated a rendering bitstream and HOA sources audio signal 506, these can be passed to a suitable MPEG-I content node 508 (which may be a server or cloud based storage element).

The content node 508 can furthermore transfer 1 position interpolated HOA source metadata and 1 HOA source audio 510 to the (MPEG-I) renderer 511.

In some embodiments the renderer 511 can be configured to operate in different modes to leverage the presence of OH and PIH sources in a 6DoF audio scene. In some embodiments as different players have preferences depending on the computational resource availability and network bandwidth availability these modes can be selected based on determined estimated computational resource requirements and network bandwidth available.

In the following example the following modes are presented, however other modes of operation are capable of being implemented.

In some embodiments there is a first rendering mode (Mode 1). The first rendering mode can be employed in some embodiments where the renderer 511 is computationally equipped to perform the state of the art MPHOA rendering. In this mode of operation the renderer 511 is configured to retrieve the OH sources and the corresponding audio signals which form a triangle based on the listener position.

This mode has the benefit of having a greater flexibility in terms of listener movement, because the mode allows the use of (typically) 3 or more OH sources. Furthermore, the mode provides the benefit of retrieving a larger amount of data in advance due to the higher likelihood of the listener moving within the triangle formed by the 3 encompassing OH sources.

Additionally this mode enables the renderer to use spatial metadata generated only for the OH sources which needs storage in addition to the OH source audio signal data.

Furthermore this mode is such that there is need for bandwidth for retrieving 3 to 5 HOA source spatial metadata as well as the audio signals since the renderer may switch between any of the audio signals depending on the listener position.

However in some embodiments with the help of the proposed OH source audio signal data, any suitable MPHOA rendering can be optimized by requiring the use of only the "best fit" OH source audio signal data. The "best fit" can be either the closest or the least changing, depending on the implementation.

In some embodiments there is a second rendering mode (Mode 2). This mode can be implemented where the renderer 511 is computationally equipped but is constrained by bandwidth. In such embodiments the renderer 511 can be configured to retrieve based on listener position, one PIH source spatial metadata and associated OH source audio signal. The renderer can perform limited 6DOF movements with the retrieved data. The renderer 511 can in some embodiments be configured to retrieve the next proximate PIH source spatial metadata and associated source audio signal for rendering.

Such a mode therefore only requires retrieving a single PIH source spatial metadata and single OH source audio signal data.

Additionally the second rendering mode is configured to generate Spatial metadata for the PIH sources in addition to the OH sources. This mode thus requires additional storage on the content node 508 (e.g., CDNs for DASH delivery).

In an embodiment, this mode can be employed where the renderer 511 is computationally and bandwidth constrained. In such embodiments the rendering mode is one where the renderer 511 is configured to retrieve PIH source spatial metadata and an associated audio signal. The renderer 511 in such embodiments is configured to perform limited 6DOF rendering.

In some embodiments there is a third rendering mode (Mode 3). The third rendering mode is one in which the renderer 511 is significantly constrained computationally. In such embodiments the renderer 511 is configured to select the closest PIH source metadata and the associated OH audio signal data to perform only 3DOF rendering.

In this third rendering mode the renderer 511 is configured to provide a better listening experiences compared to the use of the closest OH sources (which would have been the default behaviour) if the renderer was only capable of performing 3DOF rendering due to computational constraints. Furthermore there is an added benefit in that the content creator is not loaded with performing additional content creation to take care of providing spatially localized experience for renderers that have significant computational constraints. The MPEG-I encoder takes care of generating the necessary PIH sources during the creation of spatial metadata for rendering.

Figure 6:
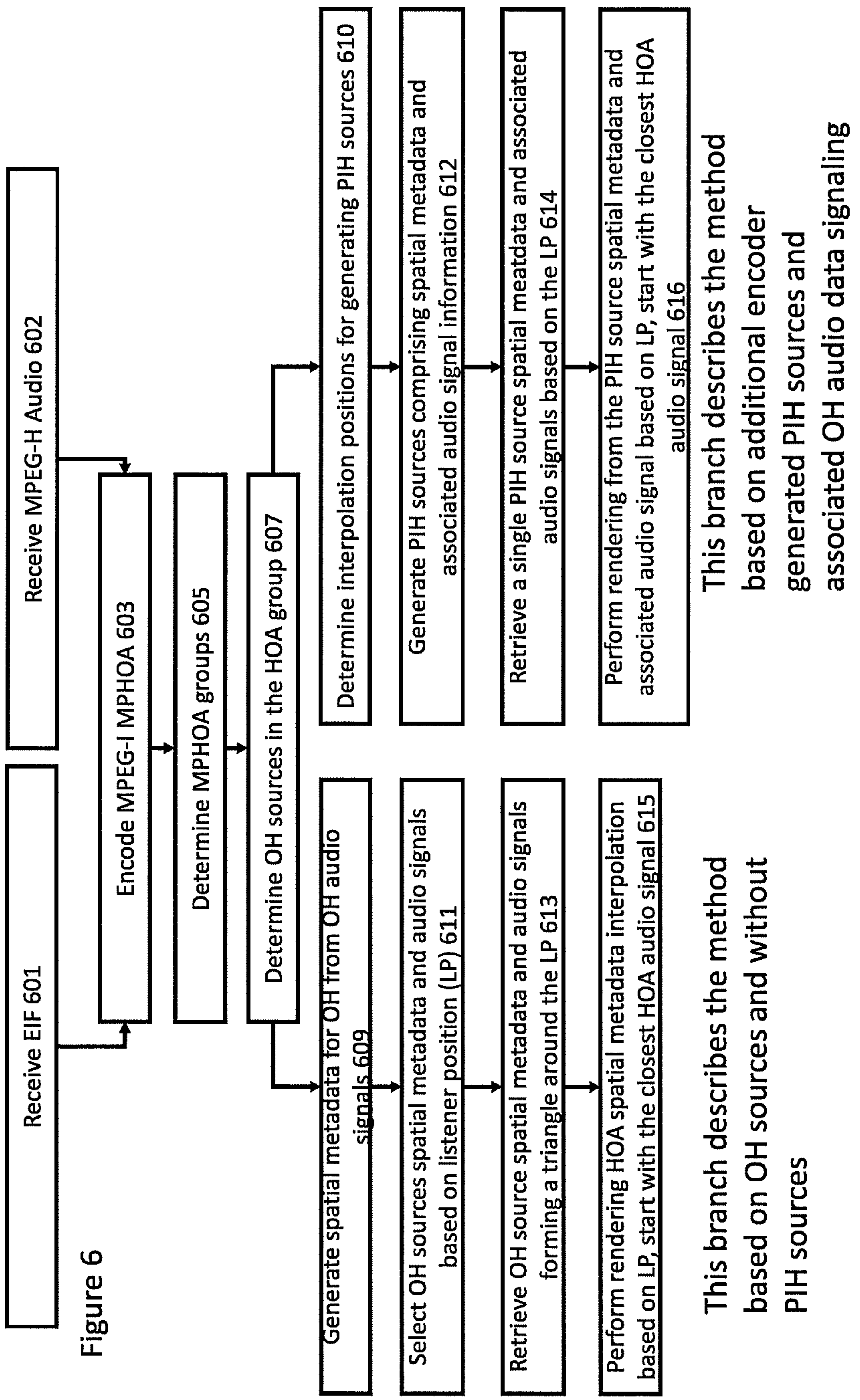
FIG. 6 shows a flow diagram of the operations of the example apparatus shown in FIG. 5 according to some embodiments.

With respect to FIG. 6 is shown the operation of the system and the operation with respect to mode 1 and mode 2 of the renderer.

Thus is shown in FIG. 6 by step 601 the operation of receiving the EIF.

Furthermore is shown the operation of receiving the MPEG-H audio as shown in FIG. 6 by step 602.

Then, having received the EIF information and the MPEG-H audio, is the operation of encoding the MPEG-I MPHOA as shown in FIG. 6 by step 603.

Having generated the MPEG-I MPHOA then the MPHOA groups are determined as shown in FIG. 6 by step 605.

Furthermore as shown in FIG. 6 by step 607 are shown the determination of the OH sources in the HOA group.

The steps 609, 611, 613, and 615 describe the method based on OH sources and without PIH sources.

For example in the first mode of rendering is shown the operation of generating the spatial metadata for OH from the OH audio signals as shown in FIG. 6 by step 609.

Further in the first mode of rendering is shown the selection of OH sources spatial metadata and audio signals based on the listener position (LP) as shown in FIG. 6 by step 611.

Additionally in the first mode of rendering is shown retrieval of OH source spatial metadata and audio signals forming a triangle around the LP as shown in FIG. 6 by step 613.

Then for the first mode of rendering is shown rendering HOA spatial metadata interpolation based on LP, starting with the closest HOA audio signal as shown in FIG. 6 by step 615.

The steps 610, 612, 614, and 616 describe the method based on additional encoder generated PIH source and associated OH audio data signalling.

For example in the second mode of rendering is shown the operation of determining interpolation positions for generating PIH sources as shown in FIG. 6 by step 610.

Additionally in the second mode of rendering is shown generating PIH sources comprising spatial metadata and associated audio signal information as shown in FIG. 6 by step 612.

Additionally in the second mode of rendering is shown retrieving a single PIH source spatial metadata and associated audio signals based on the LP as shown in FIG. 6 by step 614.

Then for the second mode of rendering is shown rendering from the PIH source spatial metadata and associated audio signal based on LP, starting with the closest HOA audio signal as shown in FIG. 6 by step 616.

Figure 7:
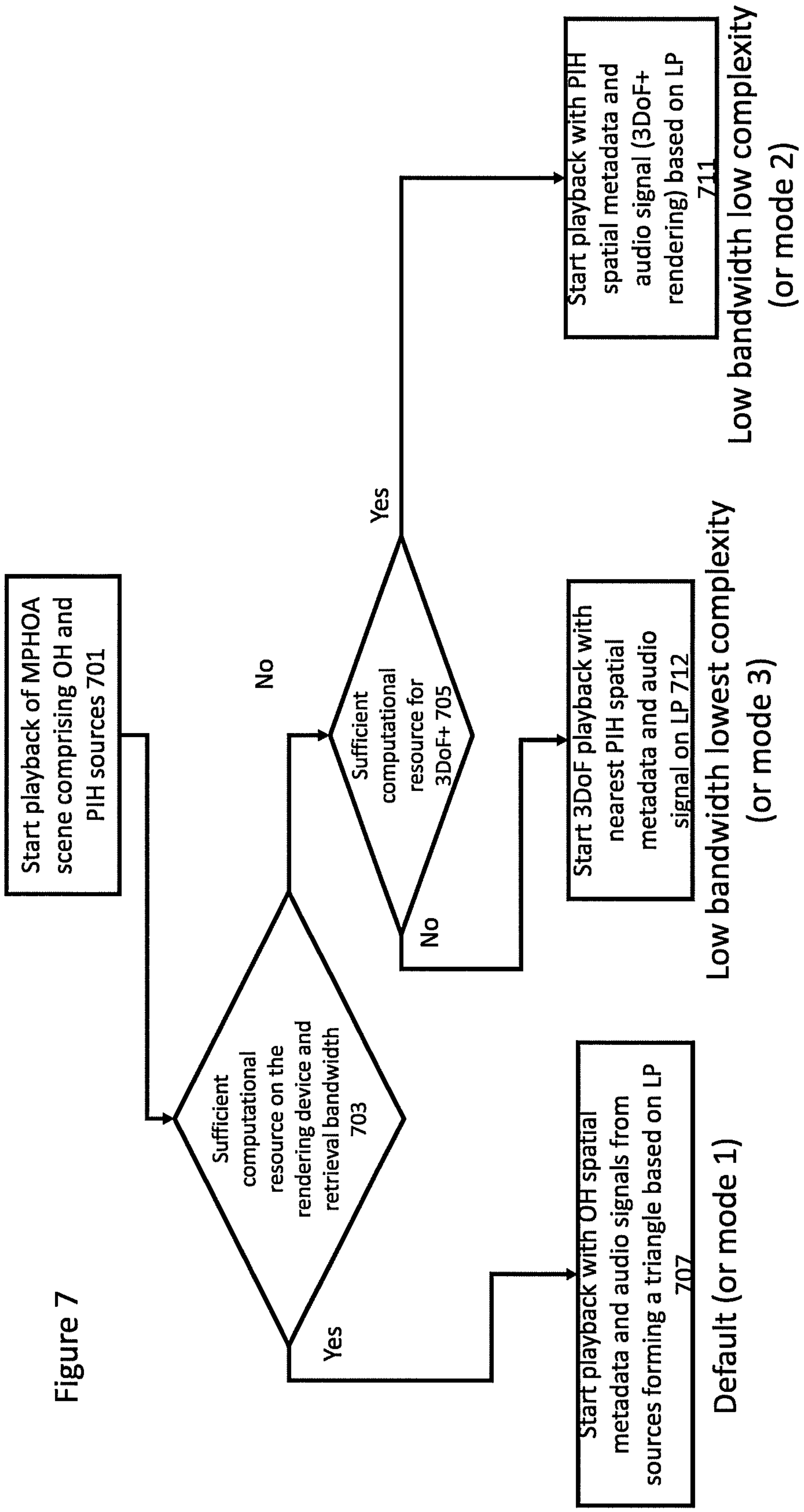
FIG. 7 shows a flow diagram of the renderer HOA source selection criteria for MPHOA rendering with rendering metadata comprising interpolated higher order ambisonics and higher order ambisonic sources.

FIG. 7 shows a flow diagram of the renderer HOA source selection criteria for MPHOA rendering with rendering metadata comprising interpolated higher order ambisonics and higher order ambisonic sources.

Thus in some embodiments the start of playback of MPHOA scene comprising OH and PIH sources is shown in FIG. 7 by step 701.

Then a determination is made as to whether there is sufficient computational resource on the rendering device and retrieval bandwidth as shown in FIG. 7 by step 703.

Where there is sufficient computational resource on the rendering device and for retrieval bandwidth then the playback is started with OH spatial metadata and audio signals from sources forming a triangle based on LP as shown in FIG. 7 by step 707. In other words the first rendering mode or default mode is employed. Where there is not sufficient computational resource on the rendering device and for retrieval bandwidth then a further check can be implemented to determine whether there is sufficient computational resource for 3DoF+ rendering to be implemented as shown in FIG. 7 by step 705.

Where there is not sufficient computational resource then the playback is started with 3DoF playback with the nearest PIH spatial metadata and audio signal based on LP as shown in FIG. 7 by step 712. In other words the third rendering mode (for low bandwidth lowest complexity) is employed.

Where there is sufficient computational resource for 3Dof+ rendering to be implemented then playback is started with PIH spatial metadata and audio signal based on LP as shown in FIG. 7 by step 711. In other words the second rendering mode (for low bandwidth low complexity) is employed.

Figure 8:
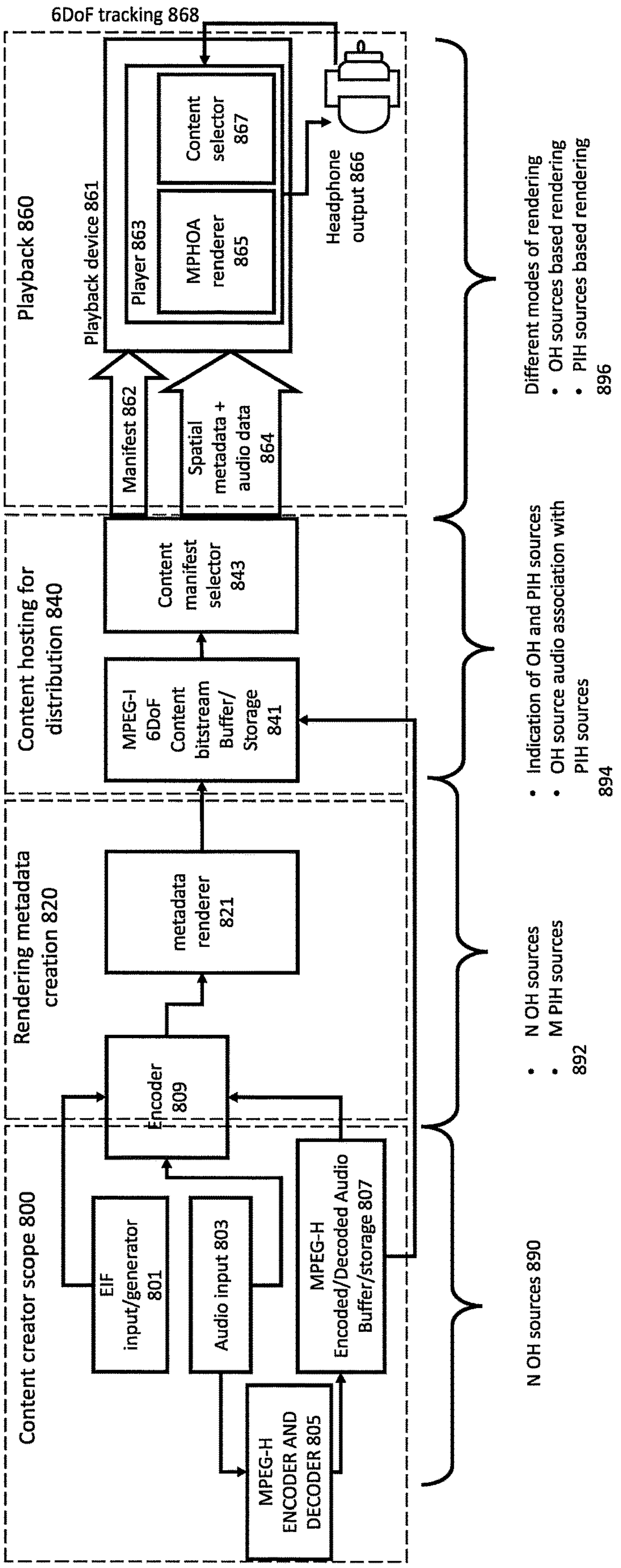
FIG. 8 shows a system within which embodiments can be implemented.

With respect to FIG. 8 is shown a further view of the system wherein there is a content creator scope 800 which is configured to generate the N OH sources 890.

In this section there is the audio input 803, the EIF input or generator 801.

Furthermore is the MPEG-H encoder and decoder 805 which is configured to receive the audio signals from the audio input and pass these to the MPEG-H encoded/decoded audio buffer/storage 807.

The MPEG-H encoded/decoded audio buffer/storage 807 can furthermore be configured to pass the encoded audio signals to the (MPEG-I) encoder 809.

Additionally this section may comprise an encoder 809 (though this may also be implemented within the rendering metadata creation 820 part. The encoder 809 is configured to obtain or receive the EIF information, the (raw) audio signals from the audio input 803 and the encoded (MPEG-H) audio and generate further PIH sources.

In some embodiments there can be a rendering metadata creation 820 section. As indicated above this can comprise the encoder 809 or obtain the output of the encoder 809.

The rendering metadata creation 820 section can in some embodiments comprise the metadata renderer 821 configured to generate the metadata as indicated above.

As such the output of the rendering metadata creation 820 section is one where there is a number (N) of OH sources and a further number (M) of PIH sources 892.

A further section in the system is the content hosting for distribution 840 section. The content hosting for distribution 840 section can provide an indication of OH and PIH sources and OH source audio association with PIH sources 894.

The content hosting for distribution 840 section in some embodiments comprises a MPEG-I 6DoF Content bitstream Buffer/Storage 841. The MPEG-I 6DoF Content bitstream Buffer/Storage 841 is configured to receive or obtain the OH and PIH sources in the bitstream and provide a suitable buffer/storage element to hold it.

Furthermore the content hosting for distribution 840 section comprises a content manifest selector 843. The content manifest selector 843 is configured to generate and output the manifest 862 and spatial metadata and audio data 864 to the playback device 861.

The playback 860 section in some embodiments is configured to implement 896 the different modes of rendering such as the OH source based rendering and the PIH source based rendering.

In some embodiments the playback device 861 comprises a player 863. The player 863 furthermore comprises a MPHOA renderer 865 and content selector 867. The player 863 is configured to output the renderer audio as a headphone output 866 to the headphone/tracker and further configured to obtain the 6DoF tracking information 868 from the same.

Figure 9:
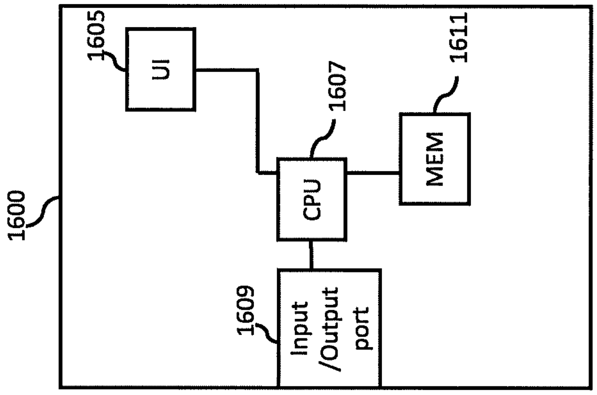
FIG. 9 shows schematically an example device suitable for implementing the apparatus shown.

With respect to FIG. 9 an example electronic device which may be used as the computer, encoder processor, decoder processor or any of the functional blocks described herein is shown. The device may be any suitable electronics device or apparatus. For example in some embodiments the device 1600 is a mobile device, user equipment, tablet computer, computer, audio playback apparatus, etc.

In some embodiments the device 1600 comprises at least one processor or central processing unit 1607. The processor 1607 can be configured to execute various program codes such as the methods such as described herein.

In some embodiments the device 1600 comprises a memory 1611. In some embodiments the at least one processor 1607 is coupled to the memory 1611. The memory 1611 can be any suitable storage means. In some embodiments the memory 1611 comprises a program code section for storing program codes implementable upon the processor 1607. Furthermore in some embodiments the memory 1611 can further comprise a stored data section for storing data, for example data that has been processed or to be processed in accordance with the embodiments as described herein. The implemented program code stored within the program code section and the data stored within the stored data section can be retrieved by the processor 1607 whenever needed via the memory-processor coupling.

In some embodiments the device 1600 comprises a user interface 1605. The user interface 1605 can be coupled in some embodiments to the processor 1607.

In some embodiments the processor 1607 can control the operation of the user interface 1605 and receive inputs from the user interface 1605. In some embodiments the user interface 1605 can enable a user to input commands to the device 1600, for example via a keypad. In some embodiments the user interface 1605 can enable the user to obtain information from the device 1600. For example the user interface 1605 may comprise a display configured to display information from the device 1600 to the user. The user interface 1605 can in some embodiments comprise a touch screen or touch interface capable of both enabling information to be entered to the device 1600 and further displaying information to the user of the device 1600.

In some embodiments the device 1600 comprises an input/output port 1609. The input/output port 1609 in some embodiments comprises a transceiver. The transceiver in such embodiments can be coupled to the processor 1607 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN)

protocol such as for example IEEE 802.X, a suitable short-range radio frequency communication protocol such as Bluetooth, or infrared data communication pathway (IRDA).

The transceiver input/output port 1609 may be configured to transmit/receive the audio signals, the bitstream and in some embodiments perform the operations and methods as described above by using the processor 1607 executing suitable code.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media, and optical media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:

at least one processor; and at least one memory storing instructions that, when executed with the at least one processor, cause the apparatus to:

obtain two or more audio scene based sources, wherein the two or more audio scene based sources are associated with one or more positions in an audio scene, wherein each audio scene based source, of the two or more audio scene based sources, comprises at least one spatial parameter and at least one audio signal;

determine at least one position associated with at least one of the obtained two or more audio scene based sources, wherein the at least one position is determined for rendering;

generate at least one audio source based on the determined at least one position to cause the apparatus to:

generate at least one spatial audio parameter based on the at least one spatial parameter of the at least one of the obtained two or more audio scene based sources in relation to the determined at least one position; and generate at least one audio source signal for the at least one audio source based on the at least one audio signal of the obtained two or more audio scene based sources in relation to the determined at least one position; and generate information about a relationship between the generated at least one spatial audio parameter and the at least one audio signal associated with:

the obtained two or more audio scene based sources, and the generated at least one audio source, wherein at least one of the obtained two or more audio scene based sources or the generated at least one audio source is configured to be selected based on a renderer preference.

2. The apparatus as claimed in claim 1, wherein determining the at least one position associated with at least one of the obtained two or more audio scene based when sources comprises the instructions, when executed with the at least one processor, cause the apparatus to:

obtain the at least one position from at least one further apparatus, and the instructions, when executed with the at least one processor, further cause the apparatus to:

transmit the information to the at least one further apparatus;

when selecting the two or more audio scene based sources, output the at least one spatial parameter and the at least one audio signal of the selected two or more audio scene based sources; and when selecting the at least one audio source, output the at least one spatial audio parameter and the at least one audio source signal of the selected at least one audio source.

3. The apparatus as claimed in claim 2, wherein the instructions, when executed with the at least one processor, cause the apparatus to:

select at least one of the two or more audio scene based sources, or the at least one audio source, based on at least one of:

a bandwidth of a transmission or storage channel between the apparatus and the at least one further apparatus; or a computation capability of the at least one further apparatus.

4. The apparatus as claimed in claim 2, wherein the instructions, when executed with the at least one processor, cause the apparatus to determine a position of the at least one audio source based on the determined at least one position from the at least one further apparatus.

5. The apparatus as claimed in claim 1, wherein the instructions, when executed with the at least one processor, cause the apparatus to:

select or define a group of audio scene based sources within the two or more audio scene based sources;

generate the at least one spatial audio parameter based on a combination of the two or more audio scene based sources and at least one spatial parameter from the selected or defined group of audio scene based sources within the two or more audio scene based sources; and generate the at least one audio source signal based on a combination of the two or more audio scene based sources and at least one audio signal from the selected or defined group of audio scene based sources within the two or more audio scene based sources.

6. The apparatus as claimed in claim 1, wherein the instructions, when executed with the at least one processor, cause the apparatus to:

obtain at least two audio signals from microphones located in the audio scene; and analyse the at least two audio signals to identify the two or more audio scene based sources and the at least one spatial parameter and the at least one audio signal comprised by each of the two or more audio scene based sources.

7. The apparatus as claimed in claim 1, wherein the instructions, when executed with the at least one processor, cause the apparatus to receive or synthesize the two or more audio scene based sources.

8. The apparatus as claimed in claim 1, wherein the two or more audio scene based sources are higher order ambisonics sources.

9. The apparatus as claimed in claim 1, wherein the at least one audio source generated based on the determined at least one position is a position interpolated higher order ambisonics source.

10. An apparatus comprising:

at least one processor; and at least one memory storing instructions which, when executed with the at least one processor, cause the apparatus to:

obtain information about a relationship between a generated at least one spatial audio parameter and at least one audio signal associated with:

an obtained two or more audio scene based sources, and a generated at least one audio source, wherein the generated at least one spatial audio parameter is generated with the generated at least one audio source, based, at least partially, on the obtained two or more audio scene based sources;

obtain a user position value and a user orientation value, wherein the user position value is associated with the obtained two or more audio scene based sources and the generated at least one audio source;

request, based at least partially on the user position value and the information about the relationship between the generated at least one spatial audio parameter and the at least one audio signal, a selection of the generated at least one audio source or at least two of the two or more audio scene based sources, and a selection of, at least, the at least one audio signal;

obtain at least one rendering source spatial parameter based on the request;

obtain at least one rendering source audio signal based on the request; and generate at least one output audio signal based on the user orientation value, the at least one rendering source spatial parameter and the at least one rendering source audio signal.

11. The apparatus as claimed in claim 10, wherein the instructions, when executed with the at least one processor, cause the apparatus to:

determine at least one of:

a bandwidth of a transmission or storage channel between the apparatus and a further apparatus from which the least one rendering source spatial parameter and the at least one rendering source audio signal is obtained; or a computation capability of the apparatus; and select the generated at least one audio source or at least two of the two or more audio scene based sources based on the bandwidth of the transmission or storage channel or the computation capability.

12. A method for an apparatus for generating an immersive audio scene, the method comprising:

obtaining two or more audio scene based sources, wherein the two or more audio scene based sources are associated with one or more positions in an audio scene, wherein each audio scene based source, of the two or more audio scene based sources, comprises at least one spatial parameter and at least one audio signal;

determining at least one position associated with at least one of the obtained two or more audio scene based sources, wherein the at least one position is determined for rendering;

generating at least one audio source based on the determined at least one position, wherein generating the at least one audio source comprises:

generating at least one spatial audio parameter based on the at least one spatial parameter of at least one of the obtained two or more audio scene based sources in relation to the determined at least one position; and generating at least one audio source signal for the at least one audio source based on the at least one audio signal of the obtained two or more audio scene based sources in relation to the determined at least one position; and generating information about a relationship between the generated at least one spatial audio parameter and the at least one audio signal associated with:

the obtained two or more audio scene based sources, and the generated at least one audio source, wherein at least one of the obtained two or more audio scene based sources or the generated at least one audio source is configured to be selected based on a renderer preference.

13. The method as claimed in claim 12, wherein the determining of the at least one position associated with at least one of the obtained two or more audio scene based sources comprises:

obtaining the at least one position from at least one further apparatus, and the method further comprises:

transmitting the information to the at least one further apparatus;

when selecting the two or more audio scene based sources, outputting the at least one spatial parameter and the at least one audio signal of the selected two or more audio scene based sources; and when selecting the at least one audio source, outputting the at least one spatial audio parameter and the at least one audio source signal of the selected at least one audio source.

14. A method for an apparatus for spatial audio signal rendering, the method comprising:

obtaining information about a relationship between a generated at least one spatial audio parameter and at least one audio signal associated with:

an obtained two or more audio scene based sources, and a generated at least one audio source, wherein the generated at least one spatial audio parameter is generated with the generated at least one audio source, based, at least partially, on the obtained two or more audio scene based sources;

obtaining a user position value and a user orientation value, wherein the user position value is associated with the obtained two or more audio scene based sources and the generated at least one audio source;

requesting, based at least partially on the user position value and the information about the relationship between the generated at least one spatial audio parameter and the at least one audio signal, a selection of the generated at least one audio source or at least two of the two or more audio scene based sources, and a selection of, at least, the at least one audio signal;

obtaining at least one rendering source spatial parameter based on the request;

obtaining at least one rendering source audio signal based on the request; and generating at least one output audio signal based on the user orientation value, the at least one rendering source spatial parameter and the at least one rendering source audio signal.

15. The method as claimed in claim 14, wherein the requesting, based on the user position value, of the selection of the generated at least one audio source and/or at least two of the two or more audio scene based sources comprises:

determining at least one of:

a bandwidth of a transmission or storage channel between the apparatus and a further apparatus from which the least one rendering source spatial parameter and the at least one rendering source audio signal is obtained; or a computation capability of the apparatus; and selecting the generated at least one audio source or at least two of the two or more audio scene based sources based on the bandwidth of the transmission or storage channel or the computation capability.

16. The method as claimed in claim 13, further comprising:

selecting at least one of the two or more audio scene based sources, or the at least one audio source, based on at least one of:

a bandwidth of a transmission or storage channel between the apparatus and the at least one further apparatus; or a computation capability of the at least one further apparatus.

17. The method as claimed in claim 13, wherein the generating of the at least one audio source based on the determined at least one position comprises determining the position of the at least one audio source based on the determined at least one position from the at least one further apparatus.

18. The method as claimed in claim 12, wherein the generating of the at least one audio source based on the determined at least one position comprises:

selecting or defining a group of audio scene based sources within the two or more audio scene based sources;

generating the at least one spatial audio parameter based on a combination of the two or more audio scene based sources and at least one spatial parameter from the selected or defined group of audio scene based sources within the two or more audio scene based sources; and generating the at least one audio source signal based on a combination of the two or more audio scene based sources and at least one audio signal from the selected or defined group of audio scene based sources within the two or more audio scene based sources.

19. The method as claimed in claim 12, wherein the obtaining of the two or more audio scene based sources comprises at least one of:

obtaining at least two audio signals from microphones located in the audio scene; or analysing the at least two audio signals to identify the two or more audio scene based sources, the at least one spatial parameter and the at least one audio signal comprised by each of the two or more audio scene based sources.

20. The method as claimed in claim 12, wherein the obtaining of the two or more audio scene based sources comprises receiving or synthesizing the two or more audio scene based sources.

* * * * *